US012593259B2

(12) United States Patent
Conceicao et al.

(10) Patent No.: US 12,593,259 B2
(45) Date of Patent: Mar. 31, 2026

(54) METHODS AND APPARATUSES FOR DATA FORWARDING IN WIRELESS COMMUNICATIONS

(71) Applicant: InterDigital Patent Holdings, Inc., Wilmington, DE (US)

(72) Inventors: Filipe Conceicao, London (GB); Alain Mourad, Ascot (GB); James Miller, Northport, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 268 days.

(21) Appl. No.: 18/563,226

(22) PCT Filed: May 26, 2022

(86) PCT No.: PCT/US2022/031146
§ 371 (c)(1),
(2) Date: Nov. 22, 2023

(87) PCT Pub. No.: WO2022/251506
PCT Pub. Date: Dec. 1, 2022

(65) Prior Publication Data
US 2024/0381222 A1      Nov. 14, 2024

Related U.S. Application Data

(60) Provisional application No. 63/193,246, filed on May 26, 2021.

(51) Int. Cl.
H04W 36/00          (2009.01)
H04W 24/10          (2009.01)
(Continued)

(52) U.S. Cl.
CPC ......... H04W 36/185 (2023.05); H04W 24/10 (2013.01); H04W 36/18 (2013.01); H04W 40/36 (2013.01)

(58) Field of Classification Search
None
See application file for complete search history.

(56) References Cited

U.S. PATENT DOCUMENTS

2021/0105674 A1      4/2021   Kim et al.

OTHER PUBLICATIONS

Interdigital, "Data Forwarding Optimization Use Case for AI", 3GPP Tdoc R3-212269, 3GPP TSG-RAN WG3 Meeting #112-e, May 17-27, 2021, 4 pages.

(Continued)

*Primary Examiner* — Sai Aung
(74) *Attorney, Agent, or Firm* — Flaster Greenberg P.C.

(57) ABSTRACT

Methods, apparatuses, and procedures for enhancements to data forwarding for dual active protocol stack handover in wireless communications are disclosed. In an example, a method implemented by a wireless transmit/receive unit for wireless communications includes determining a first point and a second point for time prediction, and a data forwarding window is defined by the first point and the second point. The method also includes sending, to a network entity, a measurement report including the first point and the second point, and receiving a feedback message including information indicating at least one of a third point or a fourth point for time prediction. At least one of the third point or the fourth point is generated based on the data forwarding window.

20 Claims, 9 Drawing Sheets

(51) Int. Cl.

| | |
|---|---|
| *H04W 36/08* | (2009.01) |
| *H04W 36/18* | (2009.01) |
| *H04W 40/36* | (2009.01) |
| *H04W 76/27* | (2018.01) |

(56) References Cited

OTHER PUBLICATIONS

Third Generation Partnership Project, "Technical Specification Group Radio Access Network; NR; Requirements for support of radio resource management (Release 16)," 3GPP TS 38.133 V16.0.0 (Jun. 2019).

Third Generation Partnership Project, "Technical Specification Group Radio Access Network; NR; Physical layer procedures for control (Release 15)," 3GPP TS 38.213 V15.12.0 (Dec. 2020).

TCL Communication Ltd: "Discussion on support of reliable and low-latency NR multicast mobility", 3GPP Tdoc R3-206556, 3GPP TSG-RAN3 WG Meeting #110-e Online, Nov. 2-13, 2020, 4 pages.

Third Generation Partnership Project, "Technical Specification Group Radio Access Network; NR; NR and NG-RAN Overall Description; Stage 2 (Release 16)," 3GPP TS 38.300 V16.5.0 (Mar. 2021).

Third Generation Partnership Project, "Technical Specification Group Radio Access Network; NR; Radio Resource Control (RRC) protocol specification (Release 16)," 3GPP TS 38.331 V16.3.1 (Jan. 2021).

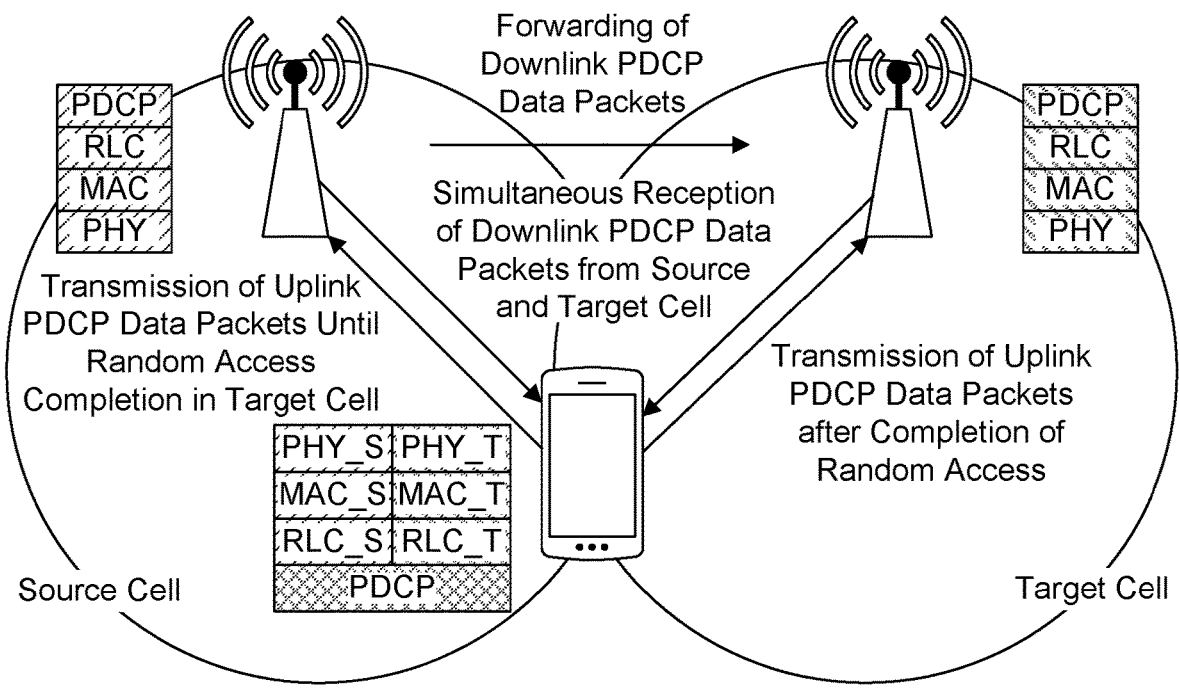

Forwarding of Downlink PDCP Data Packets

Simultaneous Reception of Downlink PDCP Data Packets from Source and Target Cell Transmission of Uplink PDCP Data Packets Until Random Access Completion in Target Cell Transmission of Uplink PDCP Data Packets after Completion of Random Access

PDCP
RLC
MAC
PHY

PDCP
RLC
MAC
PHY

| PHY_S | PHY_T |
| MAC_S | MAC_T |
| RLC_S | RLC_T |
| PDCP | |

Source Cell

Target Cell

FIG. 2

Inputs                                                    Output

$T_{RRC\_procedure}$ $T_{search}$ $T_{IU}$ $T_{processing}$ $T_\Delta$ $T_{margin}$ Source Cell ID Target Cell ID Previous P1 values Previous P2 values Heuristics/ML algorithms Dhandover1

Inputs                                                    Output

$T_{RRC\_procedure}$ $T_{event\_DU}$ $T_{measure}$ $T_{interrupt}$ $T_{CHO\_execution}$ Previous P1 values Previous P2 values Heuristics/ML algorithms

DCHO

METHODS AND APPARATUSES FOR DATA FORWARDING IN WIRELESS COMMUNICATIONS

CROSS-REFERENCE TO RELATED APPLICATION(S)

This application is a U.S. National Stage Application under 35 U.S.C. 371 of International Patent Application No. PCT/US2022/031146, filed May 26, 2022, which claims priority to and the benefit of U.S. Provisional Application No. 63/193,246 filed in the U.S. Patent and Trademark Office on May 26, 2021, the entire contents of each of which being incorporated herein by reference as if fully set forth below in its entirety and for all applicable purposes.

SUMMARY

Embodiments disclosed herein generally relate to communication networks. One or more embodiments disclosed herein are related to methods, apparatuses, and procedures for enhancements to data forwarding in wireless communications. For example, various embodiments are related to enhancements to data forwarding methods and procedures for dual active protocol stack (DAPS) handover in wireless communications.

In one embodiment, a method implemented by a wireless transmit/receive unit (WTRU) for wireless communications includes determining a first point and a second point for time prediction, and a data forwarding window is defined by the first point and the second point. The method also includes sending, to a network entity, a measurement report including the first point and the second point, and receiving a feedback message including information indicating at least one of a third point or a fourth point for time prediction. At least one of the third point or the fourth point is generated based on the data forwarding window.

In one embodiment, a WTRU comprising a processor, a transmitter, a receiver, and/or memory is configured to implement one or more methods disclosed herein. For example, the WTRU is configured to determine a first point and a second point for time prediction, and a data forwarding window is defined by the first point and the second point. The WTRU is further configured to send, to a network entity, a measurement report including the first point and the second point, and to receive a feedback message including information indicating at least one of a third point or a fourth point for time prediction. At least one of the third point or the fourth point is generated based on the data forwarding window.

In one embodiment, an apparatus for wireless communications comprising circuitry, including a transmitter, a receiver, a processor, and memory, is configured to implement one or more methods disclosed herein. For example, the apparatus is configured to determine a first point and a second point for time prediction, and a data forwarding window is defined by the first point and the second point. The apparatus is further configured to send, to a network entity, a measurement report including the first point and the second point, and to receive a feedback message including information indicating at least one of a third point or a fourth point for time prediction. At least one of the third point or the fourth point is generated based on the data forwarding window.

In another embodiment, a non-transitory computer readable medium containing data content generated according to one or more methods disclosed herein for wireless communications.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures (FIGs.) and the detailed description are not to be considered limiting, and other equally effective examples are possible and likely. Furthermore, like reference numerals ("ref.") in the FIGs. indicate like elements, and wherein:

FIG. 2 is a system diagram illustrating an example of a dual active protocol stack (DAPS) handover mechanism, according to one or more embodiments;

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System, Networks, and Devices

The methods, procedures, apparatuses and systems provided herein are well-suited for communications involving both wired and wireless networks. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
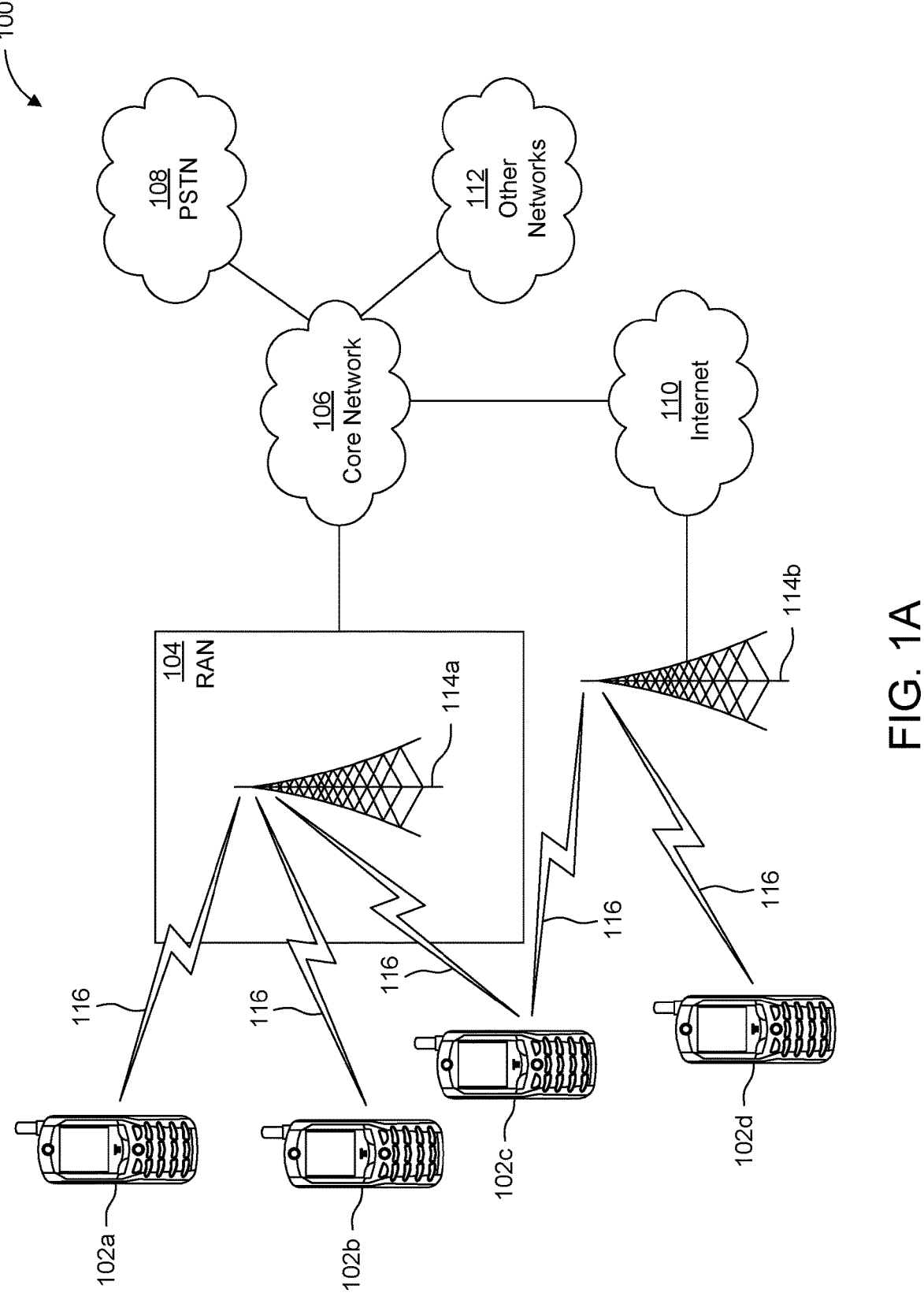
FIG. 1A is a system diagram illustrating an example communications system.

FIG. 1A is a system diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d, e.g., to facilitate access to one or more communication networks, such as the CN 106/115, the Internet 110, and/or the networks 112. By way of example, the base stations 114a, 114b may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in an embodiment, the base station 114a may include three transceivers, i.e., one for each sector of the cell. In an embodiment, the base station 114a may employ multiple-input multiple output (MIMO) technology and may utilize multiple transceivers for each or any sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In an embodiment, the base station 114a and the WTRUs 102a, 102b, 102c may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In an embodiment, the base station 114b and the WTRUs 102c, 102d may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/114 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
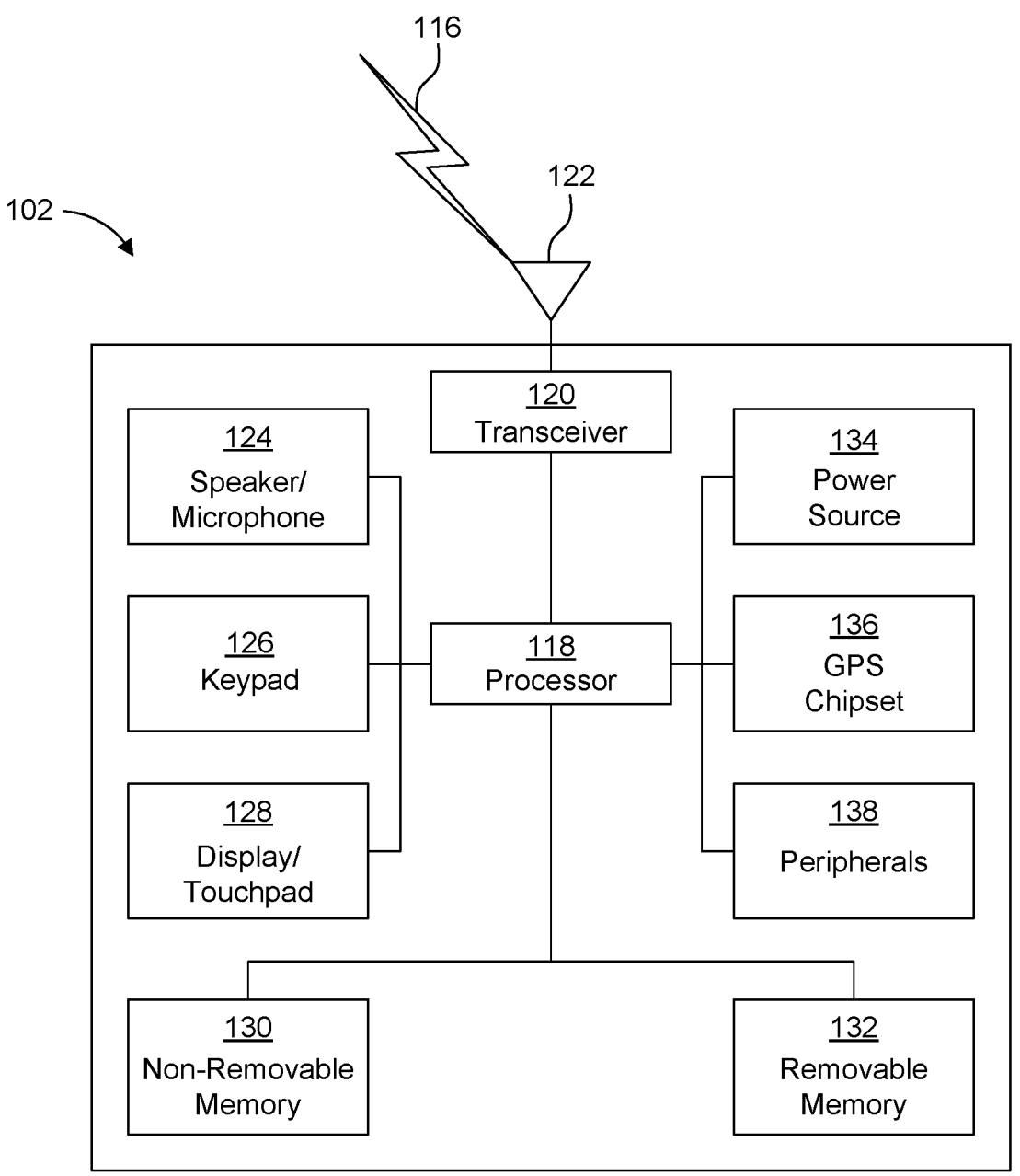
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other elements/peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. For example, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements/peripherals 138, which may include one or more software and/or hardware modules/units that provide additional features, functionality and/or wired or wireless connectivity. For example, the elements/peripherals 138 may include an accelerometer, an e-compass, a satellite transceiver, a digital camera (e.g., for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The elements/peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception)).

Figure 1C:
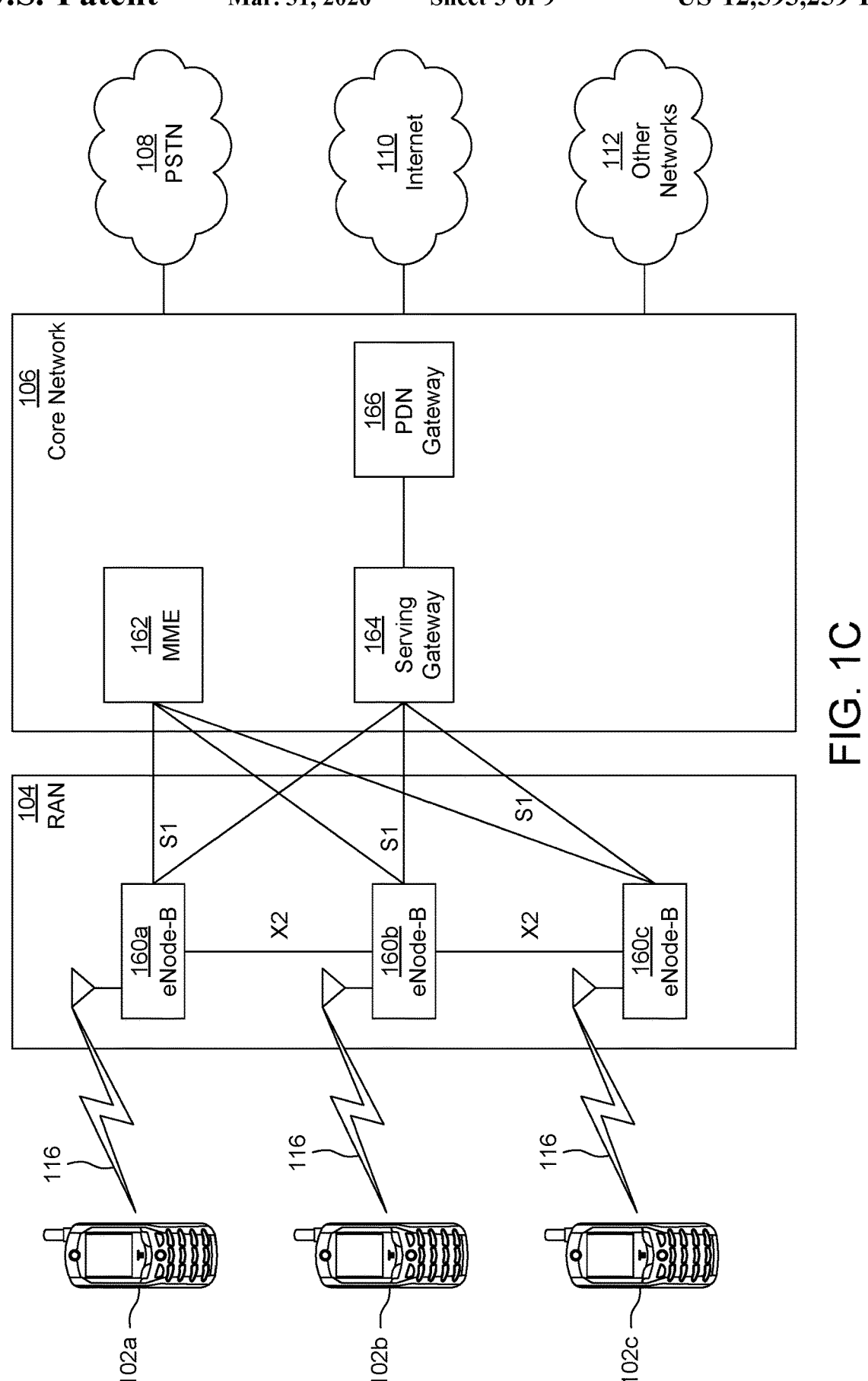
FIG. 1C is a system diagram illustrating an example radio access network (RAN) and an example core network (CN) that may be used within the communications system illustrated in FIG. 1A.

FIG. 1C is a system diagram illustrating the RAN 104 and the CN 106 according to an embodiment. As noted above, the RAN 104 may employ an E-UTRA radio technology to communicate with the WTRUs 102a, 102b, and 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink (UL) and/or downlink (DL), and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While each of the foregoing elements are depicted as part of the CN 106, it will be appreciated that any one of these elements may be owned and/or operated by an entity other than the CN operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode-Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode-B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in infrastructure basic service set (BSS) mode may have an access point (AP) for the BSS and one or more stations (STAs) associated with the AP. The AP may have an access or an interface to a distribution system (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier sense multiple access with collision avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High throughput (HT) STAs may use a 40 MHz wide channel for communication, for example, via a combination of the primary 20 MHz channel with an adjacent or nonadjacent 20 MHz channel to form a 40 MHz wide channel.

Very high throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse fast fourier transform (IFFT) processing, and time domain processing, may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to a medium access control (MAC) layer, entity, etc.

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV white space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support meter type control/machine-type communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or network allocation vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
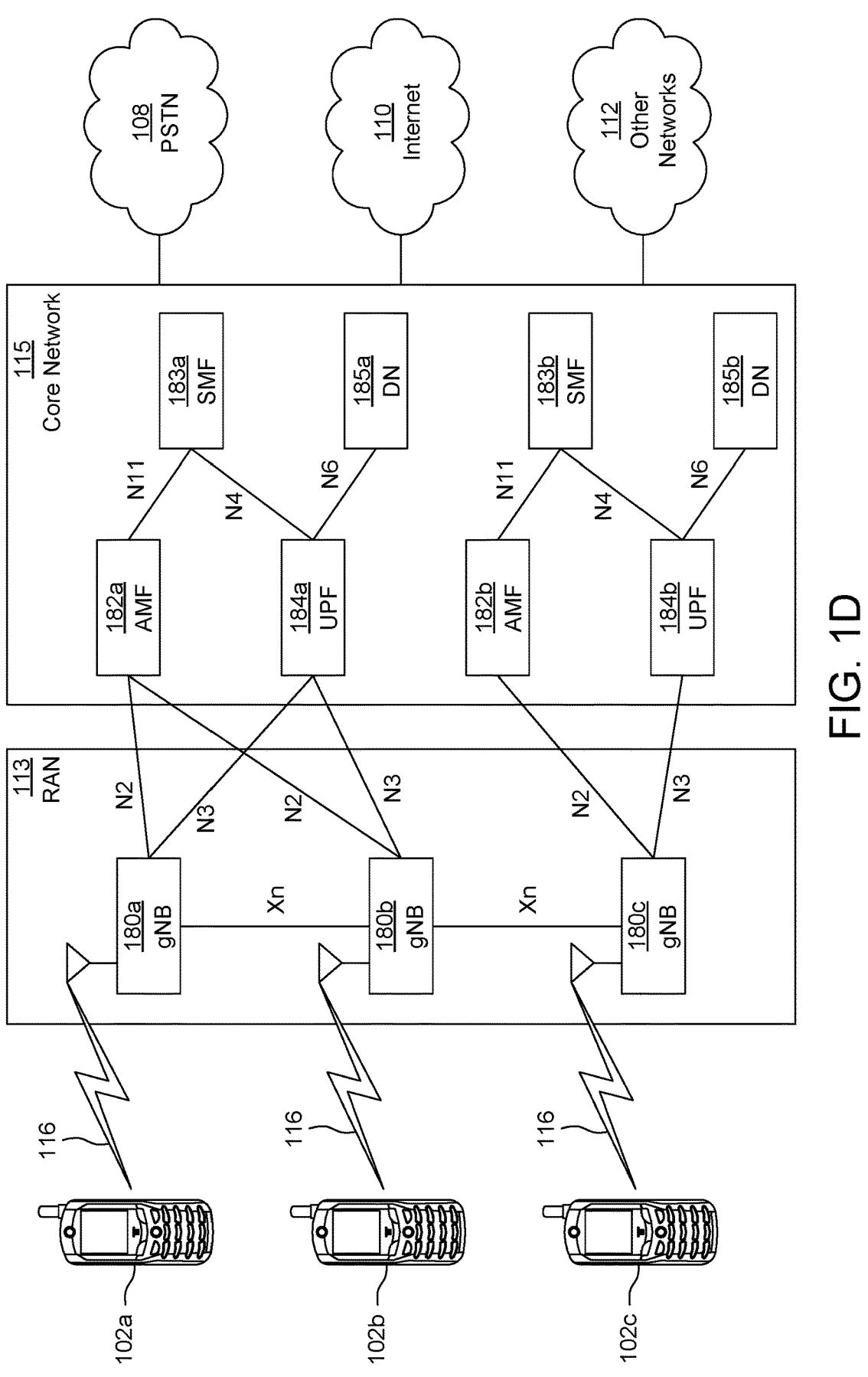
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In an embodiment, the gNBs 180a, 180b, 180c may implement MIMO technology. For example, gNBs 180a, 180b may utilize beamforming to transmit signals to and/or receive signals from the WTRUs 102a, 102b, 102c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., including a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards user plane functions (UPFs) 184a, 184b, routing of control plane information towards access and mobility management functions (AMFs) 182a, 182b, and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one session management function (SMF) 183a, 183b, and at least one Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of NAS signaling, mobility management, and the like. Network slicing may be used by the AMF 182a, 182b, e.g., to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, e.g., to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In an embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to any of: WTRUs 102a-d, base stations 114a-b, eNode-Bs 160a-c, MME 162, SGW 164, PGW 166, gNBs 180a-c, AMFs 182a-b, UPFs 184a-b, SMFs 183a-b, DNs 185a-b, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Introduction

Some wireless standards (e.g., 3GPP Release 16 and Release 17) have been targeting the introduction of additional features to enhance the support for new use cases related to smart manufacturing, connected vehicles, electrical power distribution, and more (such as drones that are controlled by the network). All of these potentially critical use cases require ultra-reliable low-latency communication (URLLC) which means high reliability and availability, as well as very low end-to-end latency (e.g., in a range of a few milliseconds). The 5G system is designed with this in mind, and the continued evolution of 5G New Radio (NR) may continue to optimize mobility performance further. A critical part of this is to reduce the handover interruption time between cells in a 5G network or system.

At handover from a source cell to a target cell, there is a brief time when a mobile terminal (e.g., a UE or a WTRU) cannot transmit or receive user data. This mobility interruption time can be defined as the shortest time duration supported by a mobile network during handover. In current 5G network implementations, such a short mobility interruption time is possible in a few scenarios, for example when the mobile terminal moves from one beam to another beam within the same cell.

In some implementations, for example, in 3GPP Release 16, Dual Active Protocol Stack (DAPS) has been introduced to address this mobility interruption time. Another description for DAPS is handover with reduced interruption time. DAPS is a technique that enhances traditional or legacy handover where a 5G system allows the connection of a UE (or a WTRU) to the source cell to remain active for communication with the source cell (e.g., reception and transmission of user data), until the UE (or the WTRU) is able to communicate (e.g., send and receive user data) with one or more target cell(s).

In an example, FIG. 2 illustrates a DAPS handover (HO) mechanism. Referring to FIG. 2, some main characteristics of the DAPS HO mechanism are: 1) continued transmission/ reception in the source cell after receiving a handover request; 2) simultaneous reception of user data from the source cell and the target cell; and 3) uplink transmission of user data switched to target cell at completion of a random access (RA or RACH) procedure.

Upon receiving the request to perform a DAPS handover, the WTRU may continue to send and/or receive user data in (or to/from) the source cell. At the same time, a new connection to the target cell is established and the WTRU may perform synchronization and/or random access in the target cell. The WTRU may establish a new user plane protocol stack for the target cell, containing Physical (PHY) layer, Medium Access Control (MAC) layer, and/or Radio Link Control (RLC) layer, while keeping the source user plane protocol stack active for transmission and reception of user data in the source cell.

Since the WTRU may receive user data simultaneously from both the source cell and the target cell, a Packet Data Convergence Protocol (PDCP) layer is reconfigured to a common PDCP entity for the source and target user plane protocol stacks. To secure in-sequence delivery of user data, PDCP Sequence Number (SN) continuation is maintained throughout the handover procedure (or process). As such, a common (for source cell and target cell) re-ordering and duplication function is provided in the single PDCP entity.

In this example, a target node (controlling the target cell) must also be prepared to transmit user data when the WTRU is ready to receive the user data in the target cell. Therefore, user data received from the 5G Core is forwarded from a source node controlling the source cell to the target node while, at the same time, the same user data is transmitted to the WTRU in the source cell. The forwarded user data is buffered in the target node until downlink transmission (e.g., to the WTRU) is started. This process is named "early data forwarding" in 3GPP terminology.

Once the WTRU has completed the random access procedure in the target cell, uplink transmission of user data is switched from the source cell to the target cell. The WTRU informs the target node of the last received data packet in the source cell. Based on this information, the target node can avoid sending duplicate downlink data packets to the WTRU, e.g., the data packets that the WTRU already received in the source cell. The target node informs the source node of the successful handover, which may trigger the source node to stop its downlink transmission to the WTRU.

Overview

In various embodiments, enhanced procedures of existing early data forwarding (e.g., for DAPS procedures) are provided. For example, the enhanced procedures may include improvements to the DAPS commands sent to one or more WTRUs, as well as improvements to the data forwarding procedure(s) between networks entities (e.g., base stations, or gNBs).

In an example, when performing data forwarding from a source gNB to a target gNB, resources need to be reserved. This may be important from a target gNB's perspective. The time that it takes for a DAPS handover to be prepared, executed and finalized may depend upon the time it takes to reserve and maintain the reservation of the required resources. In order to reduce the reservation time, it may be necessary to understand the current DAPS handover procedure with data forwarding.

Figure 3:
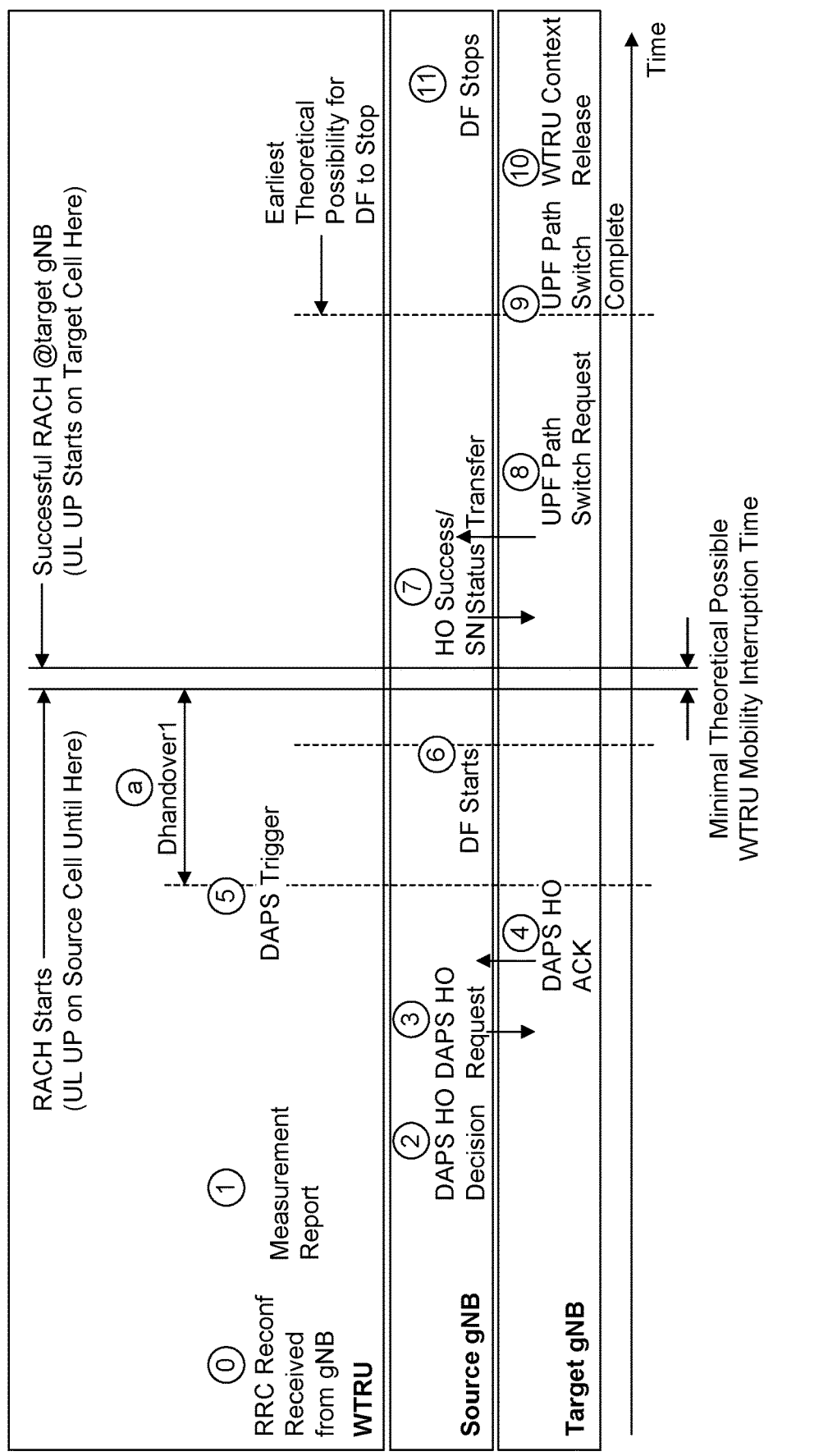
FIG. 3 is an example timeline for a DAPS handover procedure with data forwarding, according to one or more embodiments.

FIG. 3 illustrates an example timeline of a conditional reconfiguration execution where the WTRU has been configured with DAPS HO instructions. Because it is a DAPS HO, the process of early data forwarding starts before the DAPS HO is actually triggered.

Referring to FIG. 3, the example timeline for DAPS HO procedure with data forwarding may include any of the following operations (or steps) (0-10) that occur, e.g., during the example timeline:

0—A gNB may send an RRC Reconfiguration message to a WTRU, configuring the WTRU with a set of parameters for measurement reporting;

1—The WTRU may send one or more measurement reports to the source gNB, according to the reporting criteria it was configured with. In this example, the WTRU sends one measurement report. In another example, the WTRU may send multiple measurement reports, e.g., between event 0 and event 1;

2—The source gNB, to which the WTRU is connected, may evaluate the received measurement report(s) and decide whether to instruct/indicate the WTRU to perform a DAPS HO;

3—The source gNB may send a request to a target gNB, passing a transparent RRC container with necessary information to prepare the handover at the target (cell or gNB) side;

4—The target gNB may prepare the handover and may send a message (e.g., HANDOVER REQUEST ACKNOWLEDGE) to the source gNB, indicating the target gNB can accommodate the WTRU;

5—The WTRU may receive an RRC Reconfiguration message from the source gNB, instructing/indicating the WTRU to perform a random access procedure (RACH) in the target cell (e.g., with the target gNB);

6—The source gNB may start the data forwarding procedure towards the target gNB, indicating necessary frame numbering to the target gNB. The target gNB may start buffering the received data, waiting for the WTRU to connect to the target gNB. In some cases, the decision to start a data forwarding process may be a decision taken by the network (e.g., by the source gNB) upon the occurrence of one or more triggering events and/or based on the current context of the network;

7—After a successful RACH procedure at the target cell, the WTRU may complete the RRC handover procedure by sending RRCReconfigurationComplete message to the target gNB. The target gNB may send a HANDOVER SUCCESS message to the source gNB to inform that the WTRU has successfully accessed the target cell. In return, the source gNB may send the SN STATUS TRANSFER message to the target gNB. The target gNB is now responsible for the sequence numbering of the forwarded packets.

8—After the successful RACH procedure at the target cell, the target gNB may request from the Core Network (5GC) a path switch (e.g., from the User Plane Function (UPF));

9—After sending the request in the previous operation 8, the behavior of UPF is to send the last packets to the source gNB, tagging them with, for example, "end markers", and then switching the downlink (DL) data path from the source gNB towards the target gNB. At this point in time, the target gNB is now the receiver of data from the UPF and the UPF signals this information (e.g., indication or ACK) to the target gNB (e.g., via a Path Switch Request Acknowledge message). This point in time represents the earliest possible theoretical point where the Data Forwarding can stop;

10—Once the path switch in UPF completed, the target gNB may send a WTRU (or UE) CONTEXT RELEASE to the source gNB, to inform the source gNB about the success of the handover. The source gNB may now release any bearers configured for the WTRU; and/or 11—Ongoing data forwarding may continue after the previous operation 9, but eventually, at this point, the data forwarding may stop.

a—It is referenced in standard specifications that when the WTRU receives a RRC message instructing the WTRU to perform a DAPS handover (operation 5 in this timeline), the WTRU shall be ready to start the transmission of a new uplink PRACH channel (e.g., after performing a RACH procedure) within Dhandover1 milliseconds from the end of the last Transmission Time Interval (TTI) containing the RRC DAPS command (operation 5 in this timeline). This is applicable to some or all DAPS frequency groups handovers, for example, FR1 frequency DAPS HO to another FR1 frequency, FR1 frequency DAPS HO to a FR2 frequency, FR2 frequency DAPS HO to another FR2 frequency, and/or FR2 frequency DAPS HO to a FR1 frequency. In some cases, $Dhandover1=T_{RRC\_procedure}+T_{search}+T_{IU}+T_{processing}+T_{\Delta}+T_{margin}$ ms.

Where the definitions and requirements for these times are as follows (min value; max value) or (tuple of possible values):

i. $T_{RRC\_procedure}$ is a maximum RRC procedure delay as specified in clause 12 in TS 38.331 (min 0ms; max 10 ms);

ii. $T_{rs}$ is the SMTC window periodicity (or the SS/PBCH burst window) of the target NR cell (5 ms or no requirement if the SMTC window periodicity is not configured in the WTRU);

iii. $T_{search}$ is the time required to search the target cell (0ms if target cell is known; $T_{rs}$ if the target cell is an unknown intra-frequency cell; 3×Trs if the target cell is an unknown inter-frequency cell);

iv. $T_{IU}$ is the interruption uncertainty in acquiring the first available PRACH occasion in the new cell (10 ms; 20 ms; 40 ms; 80 ms; 160 ms);

v. $T_{processing}$ is time for WTRU processing (min 0ms; max 20 ms);

vi. $T_{\Delta}$ is time for fine time tracking and acquiring full timing information of the target cell. $T_{\Delta}=T_{rs}$;

vii. $T_{margin}$ is time for SSB post-processing (min 0ms; max 2 ms).

In one embodiment, the formula presented for DAPS DHandover1 may be applied to (or be also valid for) a legacy handover procedure. For example, a legacy handover (HO) may also occur at point 5 in the timeline (e.g., referring to FIG. 3) and is expressed with the same equality: $Dhandover1=T_{RRC\_procedure}+T_{search}+T_{IU}+T_{processing}+T_{\Delta}+T_{margin}$ ms. This formula covers, in a similar way, the HO time requirements for all frequency groups legacy HOs (e.g., FR1 frequency DAPS HO to another FR1 frequency, FR1 frequency DAPS HO to a FR2 frequency, FR2 frequency DAPS HO to another FR2 frequency, and/or FR2 frequency DAPS HO to a FR1 frequency).

In another embodiment, a conditional HO (CHO) may occur at point 5 in the presented timeline (e.g., referring to FIG. 3). In case of a conditional HO, this type of HO may not be triggered by a message from the network, rather it is the WTRU that triggers the HO based on meeting some criteria configuration provided by the network beforehand. When the network configures the WTRU for a conditional HO, the WTRU shall be ready to start transmission using a new uplink PRACH channel (e.g., after performing a RACH procedure) within Dhandover seconds from the end of the last TTI containing the RRC command.

In an example, $D_{CHO} = T_{RRC} + T_{Event\_DU} + T_{measure} + T_{interrupt} + T_{CHO\_execution}$.

Where:

i. $T_{RRC}$ is the is a maximum RRC procedure delay as specified in clause 12 in TS 38.331.

ii. $T_{Event\_DU}$ is the delay uncertainty, which is the time from when the WTRU successfully decodes a conditional handover command until a condition exists at the measurement reference point which will trigger the conditional handover.

iii. $T_{measure}$ is the measurements time starting from $T_{Event\_DU}$ until the WTRU executes a handover to a target cell and interruption time starts.

iv. $T_{CHO\_execution}$ is the WTRU execution preparation time for a conditional handover, and starts after the WTRU realizes the condition of CHO is met and identity of the target cell is determined. $T_{CHO\_execution}$ may be up to 10 ms.

v. $T_{interrupt}$ is the interruption time given by: $T_{interrupt} = T_{processing} + T_{IU} + T_{A} + T_{margin}$ ms Where:

$T_{processing}$ is the time for WTRU processing. $T_{processing}$ can be up to 20 ms.

$T_{IU}$ is the interruption uncertainty in acquiring the first available PRACH occasion in the new cell. $T_{IU}$ can be up to the summation of SSB to PRACH occasion association period and 10 ms.

$T_{A}$ is the time for fine time tracking and acquiring full timing information of the target cell. In some cases, $T_{A} = T_{rs}$.

$T_{margin}$ is the time for SSB post-processing. $T_{margin}$ can be up to 2 ms.

$T_{rs}$ may be configured by the network, otherwise $T_{rs} = 5$ ms.

In various embodiments, while some of these time requirements are related to radio configuration(s), and therefore related to gNB(s), others may be WTRU-specific. For example, a WTRU may (or only the WTRU) have all the presented values in these equalities stored in an internal database (or memory), either because the WTRU measures them or because the WTRU receives them from a network configuration message and stores them for further utilization. In some cases, the standard specifications may define some standard values, therefore if the WTRU-specific values and/or the gNB related configuration(s) are not stored, the WTRU may still be able to obtain/determine these values or configurations. In an aspect, the WTRU may be the node in a wireless network that could attempt to calculate or predict the value of Dhandover1 and/or $D_{CHO}$. The WTRU may (or may not) transmit these values (e.g., the value of Dhandover1) to, e.g., the source gNB and/or the target gNB. In some cases, transmitting these values may be less efficient due to the energetic cost of transmitting them to the network via an air interface. The WTRU may keep and maintain a database with values for these parameters that can later be used for machine learning (ML) predictions on future HO times and/or time markers.

In some current implementations, the DAPS HO procedure discussed above (e.g., as shown in FIG. 3) may relate to reservation of resources at the involved gNBs, and may include a high number of duplicate packets transmitted to and/or received by the WTRU, which affects all involved actors (e.g., the WTRU, the involved gNBs).

In current DAPS HO procedure, after a successful RACH procedure at the target gNB and until operation 9 in the presented timeline in FIG. 3, the WTRU may receive duplicate packets because these packets are simultaneously transmitted from source gNB and target gNB. For the resource reservation in the gNBs, the more data is forwarded, the higher or more the resource reservation would be needed.

Ultimately, the WTRU consumes some service, and that service has a certain amount of data associated with, the WTRU may need to receive the data in the downlink. Therefore, the resource reservation in the gNBs and in the WTRU (because of duplication of received packets) may only be reduced by reducing the amount of data that is forwarded from source gNB to target gNB, but guaranteeing that all the data is delivered to the WTRU.

Operation 6 and operation 9 in the presented timeline (in FIG. 3) represent the starting point and the earliest theoretical possibility for stopping data forwarding, respectively. Operation 6 is an implementation detail at the gNB and may not consider Dhandover1 because Dhandover1 is contained at the WTRU, and therefore may not be optimized Operation 9 has an ideal stopping point but as clearly stated in the specifications, the data forwarding usually ends at operation 11 in the timeline.

WTRU Driven Data Forwarding Window

In various embodiments, the current HO procedure with data forwarding (as described in FIG. 3) may be improved by optimizing the described data forwarding for HOs. For example, the described data forwarding for HO may be optimized by selecting start and stop timestamps for data forwarding. In other words, the HO procedure may be enhanced by selecting/determining a data forwarding time window.

Even if considered a time window, there is an associated amount of data to be transferred between gNBs in this window, and the WTRU is always being served with a certain QoS profile in the downlink. As such, the combination of a certain QoS profile inside a certain time window makes the latter a very practical and valid way to look at the procedure and to optimize. In some cases, the timestamps described herein for this window may also be considered as an amount of data with a start packet marker and an end packet marker. Therefore, improvements can be achieved by optimizing the data forwarding time window.

Figure 5:
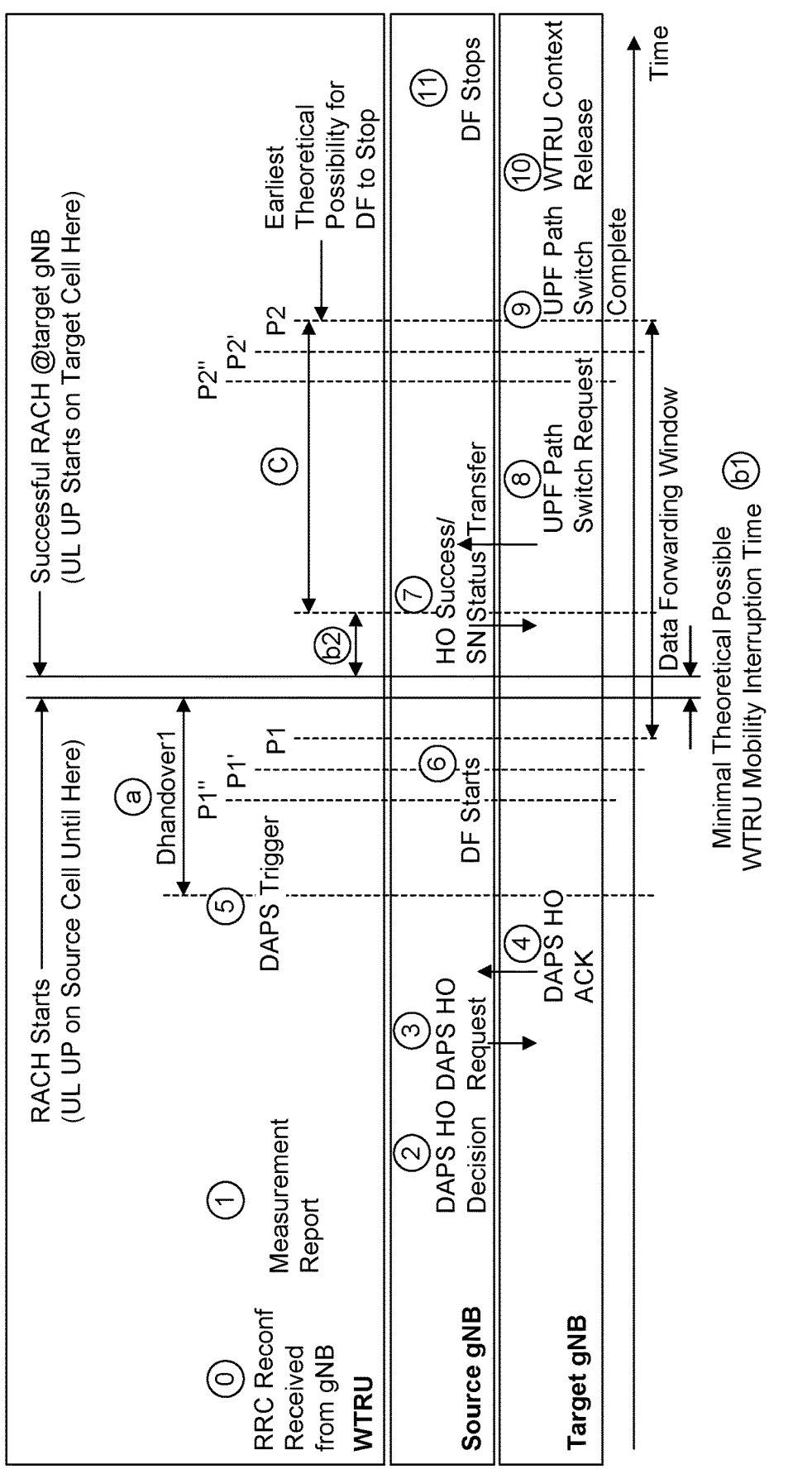
FIG. 5 is an example timeline for an enhanced DAPS handover procedure with data forwarding, according to one or more embodiments.

Another aspect that may reduce the number of forwarded packets relates to radio conditions. The WTRU performs an HO because the radio conditions at the source cell are deteriorating (and maybe improving at the target cell). The more packets are guaranteed to be delivered to the WTRU in downlink from the source cell while the HO is being executed, the less packets need to be forwarded to the target cell. The different end results for the data forwarding time window are depicted in FIG. 5, with P1/P2 defining the window that is referred to below in the rest of this document, but also with P1'/P2' and P1''/P2'' showing how the window can be adjusted to start earlier or later, based on how much packets can be sent to the WTRU in downlink via the source gNB.

In an aspect, P1 and/or P2 may be predicted via one or more machine learning methods with the database of parameters kept and maintained at the WTRU, considering the elements of DHandover1 and $D_{CHO}$, as well as one or more historical P1 and/or P2 values.

Figure 4A:
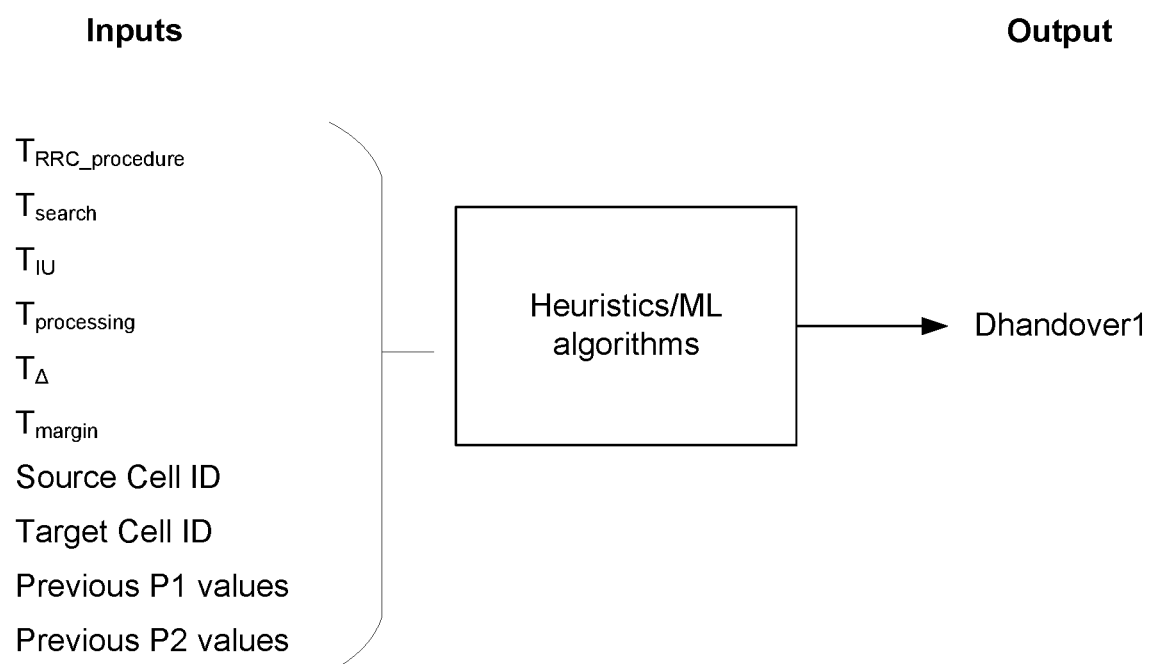
FIG. 4A and FIG. 4B are two diagrams each illustrates an example of using a database (e.g., at WTRU) and heuristics and/or machine learning methods to predict P1 and/or P2 values (or data forwarding window), according to one or more embodiments.
Figure 4B:
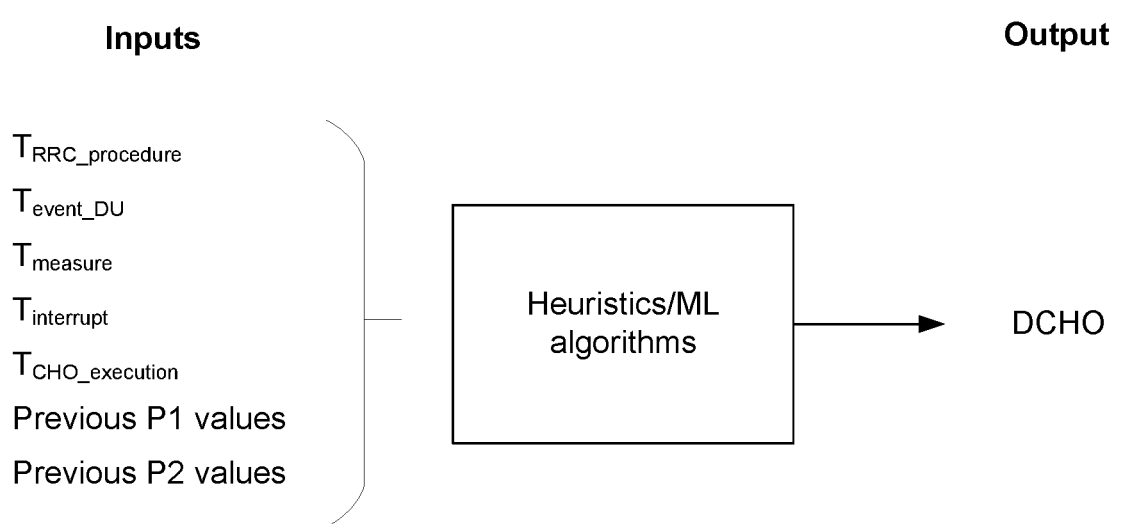

Referring to FIG. 4A and FIG. 4B, each figure illustrates an example of using a database (e.g., at the WTRU) and heuristics and/or machine learning methods to predict P1 and/or P2 values (or data forwarding window). In these two examples, how the database at the WTRU can be used to predict the P1/P2 window (e.g., the data forwarding window) is provided, using a black box approach of either heuristics and/or machine learning methods.

In some examples, given that all packets over the air interface are marked, for example, at PDCP sub-layer with a sequence number (e.g., an integer value), the P1/P2 window may also be defined by these packet markers, and the WTRU may count how many the WTRU receives in duplicate from source and/or target gNBs.

FIG. 5 illustrates an example timeline (similar to FIG. 3) of an enhanced DAPS HO procedure. Section on the initial stage: a WTRU has a model available, and RAN may also update the model.

Referring to FIG. 5, "b1" is the small time window after Dhandover1 and until the successful synchronization at the target gNB by the WTRU; "b2" is in turn the time between the achieved synchronization and an RRCReconfiguration-Complete message to target gNB (operation 7 in FIG. 3). Both b1 and b2 are known to the WTRU and the target gNB; "c" is the time window that this process targets to minimize.

The data forwarding window is marked between points P1 and P2. In this disclosure, heuristics or machine learning algorithms may be used to predict the optimal timestamps (or start packet and end marker for forwarded packets) for P1 and P2. The predictions may be a result of well-engineered Reinforcement Learning (RL) methods where no data is required for a prediction output, or via Supervised Learning (SL) methods where a small database in the WTRU can be consulted to output the prediction. The prediction of P1 occurs at the WTRU and takes into account at least Dhandover1 (e.g., that only the WTRU can predict), the measurements in small time intervals the WTRU performs continuously in all cells/beams it has been instructed to (that are used to access the limits for the WTRU to receive packets from the source gNB), QoS profile of the connection and historical WTRU mobility information (e.g., the time it takes the WTRU to perform RACH), b1 and b2. In some examples, the WTRU may output a prediction per cell (or per beam).

Prediction P1 may have to be transmitted to the source gNB as the source gNB is the node that starts the data forwarding. The source gNB may make a simple validation of the prediction, e.g., after the source gNB decides to perform a DAPS HO procedure. The source gNB may also adjust this prediction based on, for example, the latest measurement reports it received or based on its own databases with historical mobility data, if these are present and needed.

Prediction of P2 may occur at the WTRU or at the target gNB. If the prediction of P2 occurs at the WTRU, the WTRU may consider the same elements as to predict P1. After predicting P1, the WTRU may be able to estimate the necessary minimum length of the data forwarding window (mainly via QoS profiling and HO times) and it will therefore be able to predict P2. If the prediction of P2 occurs at the target gNB, the target gNB may consider historical mobility data (including b1 and b2), QoS profiling of the connection, and the delay associated with signaling with the UPF for Path Switching. For both source and target gNBs, if there are improvements or adjustments to P1 and/or P2, at both source and target gNB, there will be a feedback loop to the WTRU so that the WTRU can improve its predictions. Both gNBs may have a feedback loop between each other.

Figure 6:
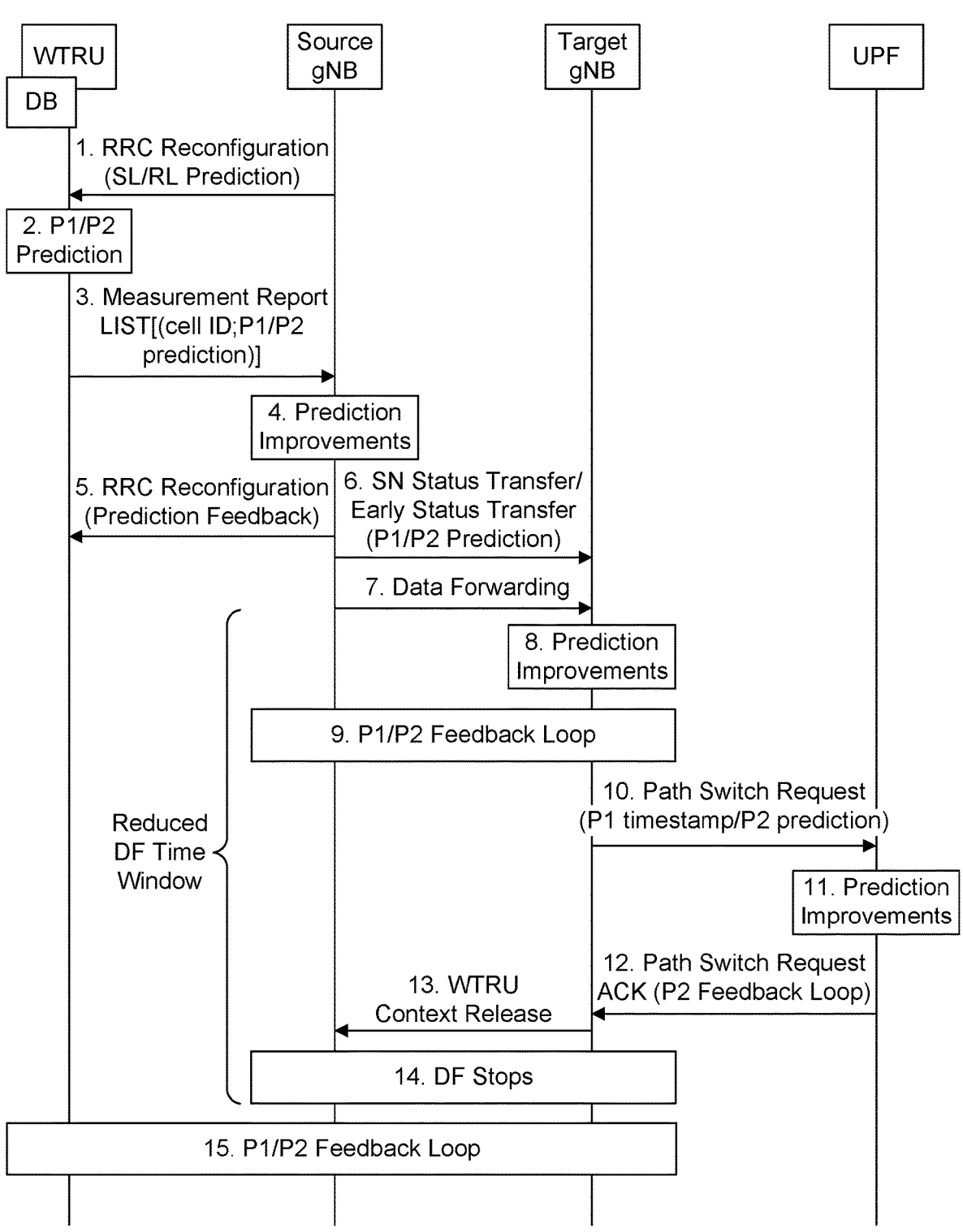
FIG. 6 is a diagram illustrating signal flows of an example enhanced DAPS handover procedure with data forwarding, according to one or more embodiments.

Referring to FIG. 6, signaling may change in order to adjust and improve the DAPS HO procedure described above. In an example, the enhanced DAPS HO procedure may include any of the operations/steps 1-15 described as follows:

1—The gNB may send an RRC Reconfiguration message to the WTRU, configuring the WTRU with the relevant parameters for measurement reporting. In this message (or another message) a new parameter is sent to the WTRU, indicating/signaling the WTRU shall predict P1, or P2, or both. In this (or any other) message, the gNB may deliver to the WTRU a pre-trained or pre-defined model that the WTRU will use for the predictions of P1, P2, or both. Alternatively, the WTRU may have one or more models pre-stored from which the gNB indicates the WTRU to choose from (e.g., via an ID or other form of indication). The WTRU may also have these models pre-stored and/or make itself a choice on which model(s) to use;

2—The WTRU may use either heuristics, RL or SL to predict P1 and/or P2, as instructed, and based on the previously mentioned information elements. Historical P1/P2 values may also be taken into consideration;

3—P1 and P2 may be incorporated in the next measurement report or other message that the WTRU sends to the source gNB. The WTRU may make these predictions for several cells and may send a list to the gNB in the form of a list of tuples (e.g., cell ID; P1; P2). A Cell ID may be replaced by a Beam ID. The WTRU may have in place an evaluation mechanism of its own predictions and avoid sending invalid values. In operation/point 0 of FIG. 3, the instructions from the source gNB to the WTRU on how to perform measurements have an associated validity. After expiry, the gNB would have to resend new instructions. An example of evaluation mechanism is to check if predictions P1 or P2 fall after that validity. In this example, there is one measurement report. In some cases, several measurement reports are sent before the DAPS HO is triggered. In that case, the P1/P2 prediction may also be sent in subsequent reports as timestamp updates or deltas to the initial value, in an effort to reduce the transmitted information in the latter case;

4—The source gNB may decide whether P1/P2 is to be improved based on its own P1/P2 assessment and/or databases;

5—The WTRU may receive an RRC Reconfiguration message from the source gNB, instructing the WTRU to perform the random access procedure (RACH) at the target cell, within the coverage of a target gNB. The source gNB may use this message (e.g., the RRC message, or another message such as another RRC message) to feedback (e.g., via DCI, MAC CE, or an SIB message) to the WTRU on its P1/P2 predictions. This feedback information may be in the form of an absolute timestamp value, or a PDCP sequence number (SN), or delta values from both these forms of feedback;

6—The source gNB may conveys the P1/P2 prediction to the target gNB by adding it in either the SN Status Transfer message or the Early Status Transfer message or another appropriate message;

7—This is now P1. Data forwarding starts;

8—The target gNB may decide/determine whether P2 should be improved/adjusted based on its own databases and considering the relevant information described above;

9—Source gNB and target gNB may use two messages which are part of the DAPS HO, HANDOVER SUC- CESS, and/or SN STATUS TRANSFER, or any other signaling to have a feedback and adjustment loop between each other (source gNB and target gNB) to improve the P1 timestamp for next HO and/or to improve/adjust P2;

10—The target gNB may send request(s) to the UPF to change the user data path from the source gNB to the target gNB. The target gNB includes the timestamp P1 and prediction P2 in the Path Switch request or other appropriate message. The UPF may use these to define the "end marker(s)" efficiently for the last packets it sends to the source gNB. This step will result in an earlier ending of the data forwarding process, that has been adjusted by all nodes involved;

11—The UPF may evaluate via any possible method if the P2 prediction it received was accurate or if adjustments were needed, considering both P1 timestamp and P2 prediction;

12—The UPF may send a Path Switch Request ACK to the target gNB, acknowledging and signaling to the target gNB that no more packets are being sent to the source gNB. The UPF includes in this (or any other message) a feedback on the P2 prediction;

13—The target gNB may inform the source gNB that it can release all radio resources for this WTRU;

14—The data forwarding process stops. This is now P2 and the end results is a reduced Data Forwarding Window; and/or 15—The WTRU, source gNB, and/or target gNB may have a further feedback loop on both P1 and P2 predictions via any signaling available amongst them. For example, as this may be the last step of the procedure, the network may provide accurate feedback to the WTRU, based on the actual events (e.g., the data forwarding window), not just gNB predictions, for P1 and/or P2. This feedback may be in the form of the absolute values in terms of timestamp or a delta in relation to the absolute timestamp. It may be the exact PDCP sequence number (SN) or a delta to this value.

In another example, in the opposite direction, the WTRU may provide feedback information to the network (e.g., the target gNB. For instance, the feedback information may include any of: a) the total number of duplicate packets the WTRU received via the source gNB and/or target gNB during the data forwarding window, b) the time length of the data forwarding window both in terms of time or number of packets, and/or c) the number of missing packets, e.g., in case the data forwarding window used was too short, and/or one or more delta values that are offsets to any of a), b), and c).

During and/or after the enhanced HO procedure, the network entities receiving the predictions provide, using signaling, feedback to the sender of the prediction reporting on the accuracy to allow for finetuning of the learning algorithms. This may be done by using the messages that are part of the enhanced DAPS HO procedure as detailed in operations/steps 5, 6, 9, 12, and 15, or it can be done via any other information exchange method between the involved actors.

Database in WTRU

This database is used in the context of WTRUs in mobility. WTRUs are carried around by people and it is rare that someone's movements are completely random. For someone usually using a WTRU in the same geographical areas, maintaining a mobility database can be very useful. This database can contain contextual as well as air interface measurements information that the WTRU records and keeps. WTRUs are consistently configured by gNBs with measurement configurations, and consistently measure the air interface for a list of cells (the gNB delivers and maintains/updates regularly). Considering both the access to a database where WTRU trajectory information is available, or considering a properly engineered RL mechanism, the WTRU may be able to make this kind of prediction for several cells that the WTRU keeps monitoring. Predictions P1 and P2 can therefore easily be inferred for a group of cells. This will in turn, help further the source gNB while the source gNB decides on which target cell/gNB it will instruct the WTRU to move to.

With regard to the WTRU database (DB) size, an example is provided below by a calculation showing 12.964 Mbyte of memory space required in the WTRU (in a worst-case scenario) where the WTRU is assumed to make use of historical HO information it maintains in the DB:

The WTRU may be required to store values for: Dhandover1–1 time value=1 Byte. Considering 1000 HOs in the data base=1 kB;

Measurements—minimum sampling interval is 20 ms→1 Byte per value (1 Byte not required but assuming) would mean 12.96 Mbyte for 3 measured quantities (e.g., the most common ones—RSRP, RSRQ and SINR) for 24 hours of measurements. The DAPS HO process takes few seconds at max, so 24 hours of measurements would be a very large radio measurements DB;

QoS profile—stored so does not influence DB;

Historical WTRU mobility information–3 timestamps–1 Byte each=3 Bytes. Considering 1000 HOs in the data base=3 kB.

Conclusion

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

What is claimed is:

1. A method implemented by a wireless transmit/receive unit (WTRU) for wireless communications, the method comprising:

determining a first point and a second point for time prediction, wherein a data forwarding time window is defined by the first point and the second point;

sending a measurement report including the first point and the second point for time prediction; and receiving a feedback message including information indicating at least a third point for time prediction, wherein the third point is generated based on the data forwarding time window.

2. The method of claim 1, wherein:

the first point for time prediction is a first time prediction point, a first timestamp, or a start packet marker; and the second point for time prediction is a second time prediction point, a second timestamp, or an end packet marker.

3. The method of claim 1, wherein;

the third point for time prediction is a third time prediction point, a third timestamp, or an updated start packet marker.

4. The method of claim 1, wherein the third point for time prediction comprises an updated value or an offset for updating the first point or the second point.

5. The method of claim 1, wherein the data forwarding time window is for a dual active protocol stack (DAPS) handover.

6. The method of claim 1, wherein the data forwarding time window is associated with a set of data within the first point and the second point.

7. The method of claim 1, wherein each of the first point and the third point is associated with a respective start packet marker.

8. The method of claim 1, wherein an updated data forwarding time window is defined by the third point and a fourth point indicated by the feedback message for time prediction.

9. The method of claim 1, wherein an updated data forwarding time window is defined by the third point and a fourth point indicated by the feedback message for time prediction.

10. The method of claim 1, wherein the second point is generated based on an estimate of a minimum length of the data forwarding time window.

11. The method of claim 1, wherein the feedback message is received from a source network entity, a target network entity, or a user plane function.

12. The method of claim 1, wherein the third point is generated by a source network entity, a target network entity, or a user plane function.

13. The method of claim 1, further comprising receiving an indication to determine or generate the first point and the second point for time prediction and data forwarding.

14. The method of claim 1, further comprising sending a message indicating any of: 1) a total number of duplicate packets the WTRU received during the data forwarding time window, 2) a length or size of the data forwarding time window, 3) a number of missing packets during the data forwarding time window, or 4) a delta value of any of 1), 2), or 3).

15. A wireless transmit/receive unit (WTRU) comprising circuitry, including a processor, a receiver, a transmitter, and memory, the WTRU configured to:

determine a first point and a second point for time prediction, wherein a data forwarding time window is defined by the first point and the second point;

send a measurement report including the first point and the second point for time prediction; and receive a feedback message including information indicating at least a third point for time prediction, wherein the third point is generated based on the data forwarding time window.

16. The WTRU of claim 15, wherein:

the first point for time prediction is a first time prediction point, a first timestamp, or a start packet marker, the second point for time prediction is a second time prediction point, a second timestamp, or an end packet marker, and the second point is generated based on an estimate of a minimum length of the data forwarding time window, or the third point for time prediction is a third time prediction point, a third timestamp, or an updated start packet marker, and the third point is generated by a source network entity, a target network entity, or a user plane function.

17. The WTRU of claim 15, wherein the third point for time prediction comprises an updated value or an offset for updating the first point or the second point, and wherein an updated data forwarding time window is defined by the third point and a fourth point indicated by the feedback message for time prediction.

18. The WTRU of claim 15, wherein the data forwarding time window is 1) for a dual active protocol stack (DAPS) handover, or 2) associated with a set of data within the first point and the second point.

19. The WTRU of claim 15, wherein each of the first point and the third point is associated with a respective start packet marker, and each of the second point and the third point is associated with a respective end packet marker.

20. The WTRU of claim 15, wherein the WTRU is further configured to:

receive an indication to determine or generate the first point and the second point for time prediction and data forwarding; or send a message indicating any of: 1) a total number of duplicate packets the WTRU received during the data forwarding time window, 2) a length or size of the data forwarding time window, 3) a number of missing packets during the data forwarding time window, or 4) a delta value of any of 1), 2), or 3).

\* \* \* \* \*